Dec. 28, 1965
D. R. FERRIS
3,226,025
ELECTRICALLY DRIVEN THERMOSTATICALLY CONTROLLED HEAT
REGULATING MECHANISM FOR AUTOMOTIVE VEHICLES
Filed Feb. 21, 1963
3 Sheets-Sheet 1
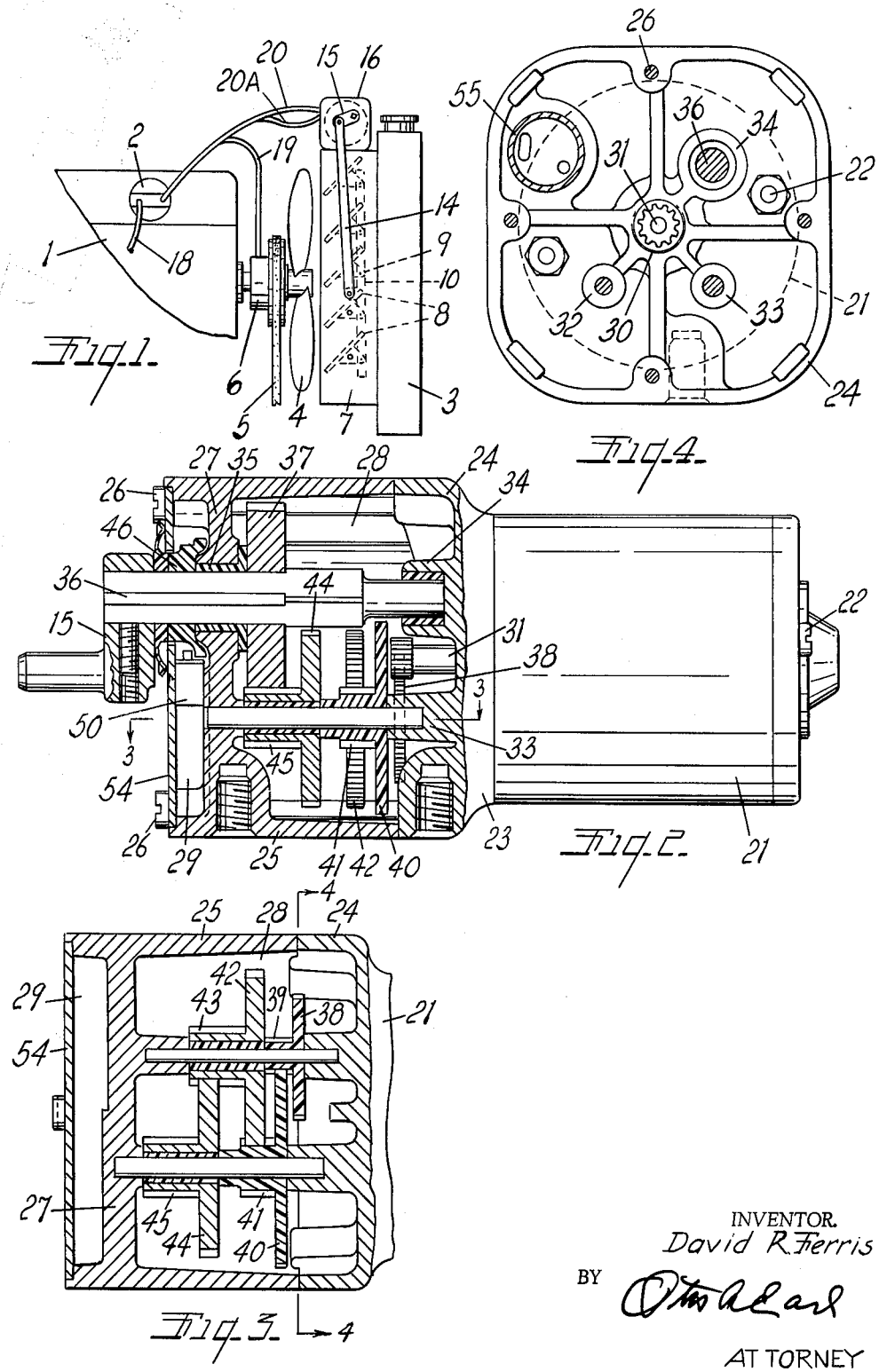
INVENTOR.
David R. Ferris
BY
ATTORNEY

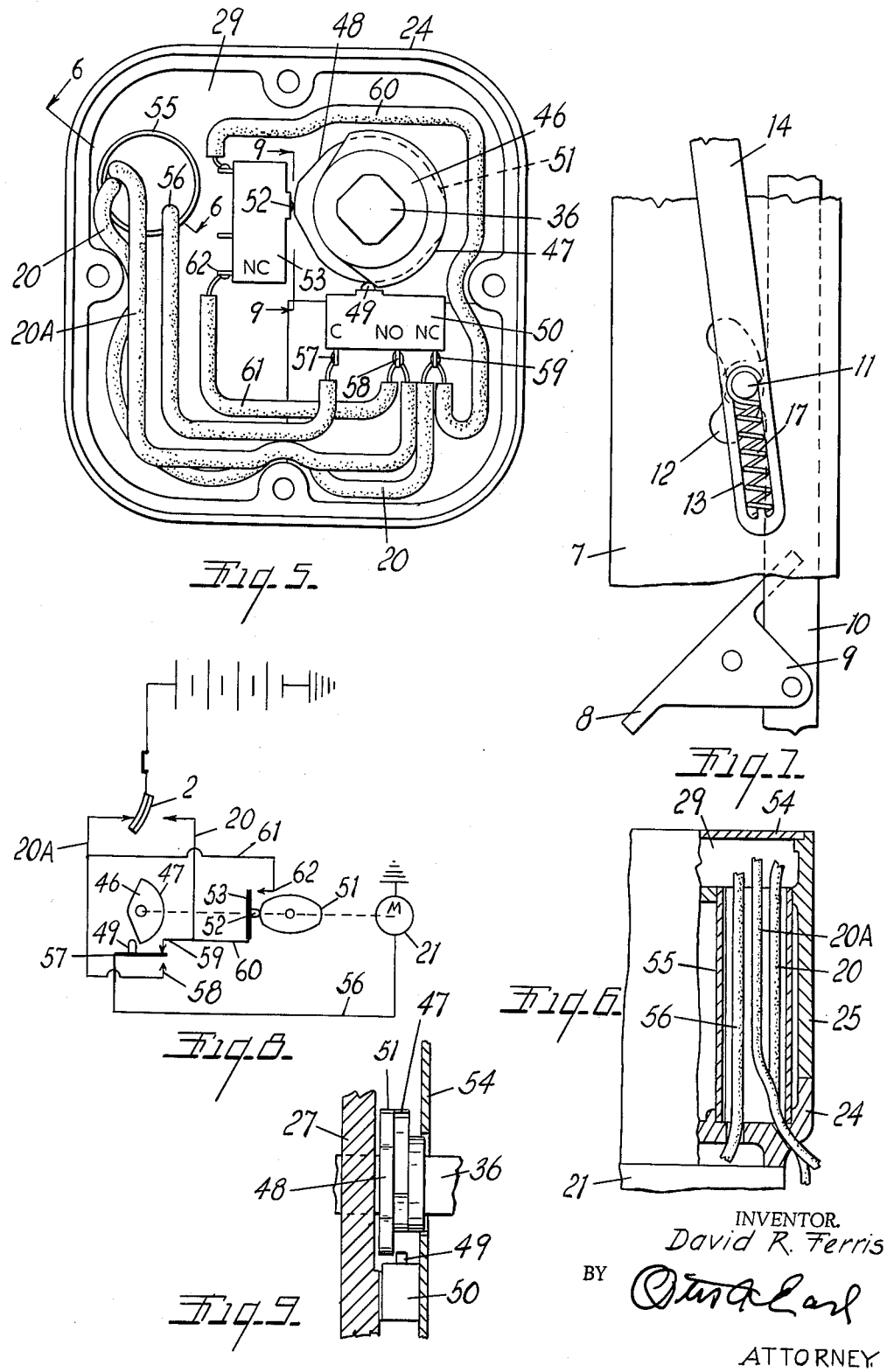

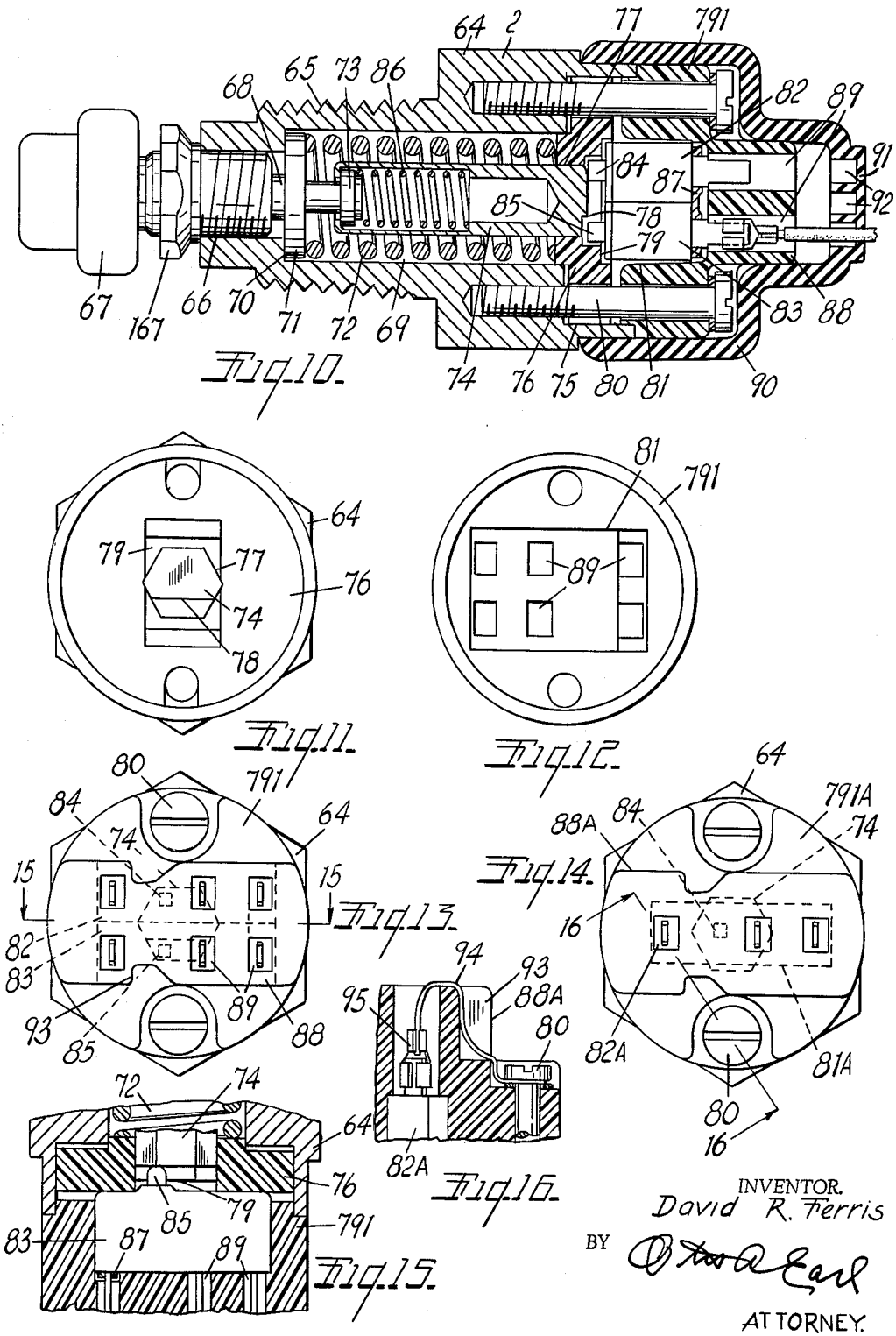

United States Patent Office 3,226,025
Patented Dec. 28, 1965

3,226,025
ELECTRICALLY DRIVEN THERMOSTATICALLY CONTROLLED HEAT REGULATING MECHANISM FOR AUTOMOTIVE VEHICLES
David R. Ferris, Cadillac, Mich., assignor to Kysor Industrial Corporation, Cadillac, Mich.
Filed Feb. 21, 1963, Ser. No. 260,204
9 Claims. (Cl. 236—35)

This invention relates to improvements in electrically driven thermostatically controlled heat regulating mechanism for automotive vehicles.

The principle objects of this invention are:

First, to provide a heat control system for the internal combustion engine of an automotive vehicle which will succesively deactivate the fan and close the shutters over the radiator of a liquid cooled engine in response to changes in temperature in the engine and by means of electrically actuating clutch and shutter controls, or control a shutter alone.

Second, to provide an electrically driven shutter operating mechanism in which a small high speed electric motor is connected through a gear reduction transmission to the shutter mechanism to close the radiator shutters by one-half revolution of a driven crank and conversely open the shutters by a further one-half revolution of the crank, with a spring loaded over-travel connection between the crank and the shutters to assure tight closing pressure between the shutters.

Third, to provide a novel form of electrically driven control for actuating any part between two opposite positions, such as the open and closed positions of a radiator shutter in which an electric motor and speed reduction transmission are provided with switches driven by the motor to automatically actuate the transmission and control to one extreme of adjustment and stop automatically in response to a first electrical signal and then continue to the opposite extreme of adjustment and stop in response to a second electrical signal.

Fourth, to provide a relatively simple and inexpensive motor and transmission assembly with motor controlling switches driven by the assembly to reliably control the operation of the assembly between its opposite extremes of adjustment.

Fifth, to provide a novel and inexpensive form of thermostatically actuated switch mechanism in which the parts are conveniently and accurately held against rattling and displacement while providing accurate actuation of one or more switches in response to changes in the temperature of a temperature sensing element.

Sixth, to provide a thermally actuated electric switch assembly, the parts of which are inexpensive to form and easy to assemble in accurately adjusted and permanently retained positions and in which a single interchangeable alternate part will convert the switch assembly between a single switch or double switch mechanism, and permit alternate wiring of the switches.

Other objects and advantages of the invention will be apparent from a consideration of the following description and claims. The drawings of which there are three sheets illustrate a highly practical form of the invention embodied in the heat control system of an automotive engine and including alternative arrangements for regulating the radiator, shutter and fan of the system or singly controlling the shutter.

FIG. 1 is a fragmentary side elevational view of a liquid cooled internal combustion engine and associated radiator and fan having the shutter control and fan control of the invention associated therewith.

FIG. 2 is a fragmetary vertical longitudinal cross sectional view through the driving motor and transmission and associated control cams of the shutter operating motor shown in FIG. 1.

FIG. 3 is an enlarged cross-sectional view through the speed reducing transmission and control cam assembly taken along the plane of the line 3—3 in FIG. 2.

FIG. 4 is a fragmentary vertical transverse cross-sectional view through the transmission showing the transmission end member and motor base in elevation from the transmission side thereof.

FIG. 5 is an enlarged end elevational view of the motor cam and switch end of the transmission with the end cover plate removed.

FIG. 6 is a fragmentary longitudinal cross-sectional view through the transmission showing the wiring conduit therein, the view being taken along the plane of the line 6—6 in FIG. 5.

FIG. 7 is an enlarged fragmentary side elevational view of the springable over-travel connection between the transmission and the shutter operating mechanism.

FIG. 8 is a schematic wiring diagram of the driving motor and cam controlled switches therefor.

FIG. 9 is a fragmentary side elevational view of the control cam assembly taken along the plane of the line 9—9 in FIG. 5.

FIG. 10 is a fragmentary longitudinal cross-sectional view through the thermostatically actuated switch of the system shown in FIG. 1.

FIG. 11 is an end elevational view of the outer end of the switch assembly shown in FIG. 1 with the weather seal and cover and switches and cap removed.

FIG. 12 is an elevational view of the inner face of the switch end member with the switches removed.

FIG. 13 is an end elevational view of the switch shown in FIG. 11 with the cover removed.

FIG. 14 is an end elevational view of a modified form of the switch shown in FIG. 13 with an end member modified for single switch operation.

FIG. 15 is a fragmentary transverse cross sectional view taken along the plane of the line 15—15 in FIG. 13.

FIG. 16 is a fragmentary cross sectional view taken along the plane of the line 16—16 in FIG. 14 showing an alternative way in which the switch may be wired to accommodate alternative circuits.

It is a feature of the invention that the thermostatic switch assembly, as well as the shutter operating motor are widely adaptable for controlling and operating a wide variety of parts with a wide variety of control circuits in additions to the particular shutter and fan control disclosed.

FIG. 1 more or less conventionally illustrates the heat control mechanism of the invention applied to a liquid cooled internal combustion engine 1 having a thermostatically actuated switch assembly 2 mounted in the engine block to sense the temperature of the engine. The engine is provided with a radiator 3 connected to the engine block by conventional connections, not illustrated. A fan 4 is driven by the belt 5 through a magnetic clutch 6 to draw air through the radiator when necessary.

A frame 7 supports a plurality of pivoted louvered slats or shutters 8 behind the radiator and the individual shutter slats are provided with ears 9 pivotally connected to an upright common actuating bar 10, the bar 10 carries a pin 11 (see FIG. 7) projecting through an arcuate slot 12 in the shutter frame and the pin 11 is passed through a slot 13 in a connecting rod 14 that extends upwardly to a crank 15 on a gear reducer motor assembly 16 mounted on the top of the shutter frame.

The arrangement of the crank 15 and connecting rod 14 is such that the shutter slats 8 are closed when the crank 15 is at the upper limit of its travel and are open when the crank is at the lower limit of its travel. An overtravel spring 17 positioned in the slot 13 permits the connecting rod and crank to move upwardly to their extreme upper limit of motion while imparting a yieldable closing force to the shutter slats.

The thermostatic switch assembly 2 is supplied with current from the battery or other voltage source in the vehicle through the conductor 18 and functions as will be described presently to successively energize the conductor 19 for energizing and engaging the magnetic clutch 6 and thereafter energizing the conductors 20 and 20A for energizing the driving motor transmission assembly 16 for operating the shutter.

CONTROL MOTOR, GEAR REDUCTION AND CONTROL CAM ASSEMBLY

FIGS. 2 through 6, 8 and 9 illustrate the construction of the driving motor and its speed reducing transmission and control cams and switches for operating the shutter driving crank 15. The motor 21 is a small amperage high speed electric motor of the nonreversible type. It is mounted by means of screws 22 passed through the motor casing to a generally circular base 23 formed on and merging into a generally rectangular gear case end member 24. The end member 24 seats tightly against the end of the hollow rectangular gear case 25 and is secured thereto by long screws 26 passing through thickened bosses in the inside of the cases into tapping holes in the end member. A partition 27 in the gear case divides the case into a relatively large gear chamber 28 and a relatively short switch chamber 29 at the opposite end of the gear case from the motor.

As appears most clearly from FIG. 4, the gear case end member 24 is provided with a central inwardly projecting boss 30 which receives the projecting end of the motor shaft 31 from the motor 21. The end member also carries a pair of laterally spaced lower bosses 32 and 33 and an upwardly spaced boss 34 all spaced angularly about the motor shaft 31. The partition 27 in the gear case is provided with holes or bearings corresponding in position to the bosses 32, 33 and 34 with a plastic or other antifriction bearing 35 positioned in the upper opening to rotatably support the mid-section of the crank shaft 36. The rear end of the crank shaft 36 is journaled in the boss 34 and the shaft projects outwardly of the case to support the previously described crank 15. Outwardly from the bearing boss 34, the crank shaft is of generally rectangular stock with rounded corners which rotate in the bearing 35 but nonrotatably engage a metal final drive gear 37.

The lower bosses 32 and 33 support counter shafts on which a series of gears and pinions are rotatably mounted. These gears and pinions appear most clearly in FIG. 3 in which the gear 38 meshes with teeth on the end of the motor shaft and has a pinion portion 39 and driving gear 40. The pinion portion 41 on the gear 40 drives the gear 42 and pinion portion 43 on the gear 42 drives a gear 44 having a pinion portion 45 driving the final gear 37. The gears and pinions 38 to 41 operate at high speed from the electric motor and are desirably formed of durable plastic while gears and pinions 42 to 45 and 37 rotate at progressively slower speeds and high torque and are desirably made of metal. The overall gear reduction from the motor shaft 31 to the crank shaft 36 is of the order of 835 to 1 so the crank shaft and crank are driven at a relatively slow speed of about three revolutions per minute and with relatively high torque.

The crank shaft 36 has a plastic cam 46 mounted on its square cross section within the switch chamber 29 and the cam has axially spaced cam contours 47 and 48 thus actually constituting a double cam. The cam contour 47 has a continuous lift or actuating contour which extends somewhat more than 180 degrees around the cam and is positioned to actuate or depress the actuating button 49 of a first switch assembly 50 mounted in the switch chamber (see FIG. 5). The other cam contour 48 has oppositely opposed narrow lifts 51 positioned to engage and depress the actuating plunger 52 of a switch assembly 53 during the time that the contour 47 is passing onto or off of the actuating plunger 49 of the first switch. The switches, cam and wiring to be described presently are enclosed and sealed within the switch chamber 29 by an end plate 54.

The relative arrangement and electrical connection of the switches 50 and 53 is shown in FIGS. 5, 6 and 8. An insulated tube or conduit 55 extends through the gear chamber and terminates in overlapping relation to the edge of the motor base and motor 23 and the energizing wire 56 for the motor extends through this conduit to the switch chamber where it is connected at 57 to the common terminal of a double throw single pole switch 50. The other side of the motor is grounded. The switch 50 has a normally open terminal 58 which is open or separated from the common terminal 57 when the button 49 is raised and a normally closed contact or terminal 59 which is closed on the common terminal 57 when the button is raised. The common terminal 57 is connected to either the terminal 58 or 59 and has no open or off position except for the very short interval when the terminal is being moved by cam 46 between terminals 58 and 59. Cam 46 does not provide for an open position of the switch for any appreciable degree of rotation of the cam.

The control conductor 20 from the thermostatic switch 2 has two separate conductors 20 and 20A which are energized alternately by the thermostatic switch, as will be described, and these two conductors are introduced into the rear side of the gear casing and the tube 55 externally of the motor and extended through the tube to the switch chamber where they are connected separately to the normally open terminal 58 and the normally closed terminal 59. A conductor 60 connects one side of switch 53 to terminal 59 and control conductor 20 while a conductor 61 connects the normally closed terminal 62 of switch 53 to terminal 58 and control conductor 20A.

FIGS. 5 and 8 illustrate the system in a condition at the end of a shutter adjusting cycle. The crank 15, not shown in these figures, will be either up or down. Assume that thermostatic switch 2 has energized conductor 20A and terminal 58 previously closed by depression of switch button 49 by the cam contour 47. This energized the conductor 56 and caused 180° rotation of the crank shaft and cam until the contour 47 moved off of button 49 opening the motor circuit. If now the switch 2 changes due to temperature change in the motor, conductor 20 will be energized and terminal 59. This energizes the motor through normally closed contacts of switch 50 until the cam contour 47 rotates 180° and opens the contacts at terminal 59.

Switch 53 and cam 51 form a holding device to assure completion of each 180° cycle of cam 46. As cam 46 starts a cycle, one of the lifts 51 moves off of switch button 52 so that normally closed terminal 62 is closed. If then the thermostatic switch 2 changes in the middle of a cycle of the motor and cam, the conductors 60 and 61 will assure that both conductors 20 and 20A will be energized for the completion of the cycle. The opposite cam contour 51 will then open the holding circuit but the system will immediately start a new cycle and continue another 180° as required by the new setting of switch 2. Thus a change in engine temperature while the shutters are shifting position will not result in the system being stalled in an inoperative condition.

THERMOSTATIC SWITCH ASSEMBLY

The thermostatic switch 2 is shown in FIGS. 10 to 16 and is characterized by ease of accurate manufacture and assembly. The body 64 is a screw machine part of hexagonal bar stock turned with an external taper thread 65 on its inner end to screw into the motor block. The inner end is bored and tapped at 66 to receive the stem of a commercial thermal button 67. The button contains a mass of thermally expansible material which extends a plunger 68 into the counter bore 69 in proportion to the temperature increase. The counter bore forms an internal shoulder 70 against which an actuating button 71 is urged by spring 72. The button 71 has a shouldered neck 73 that projects into the turned in end of an actuating plunger 74.

The outer end of the body 64 is turned round and internally chambered at 75. A circular bearing member 76 of molded plastic material fits within the chamber 75 with a short neck extending into the bore 69. The bearing member has a hexagonal hole 77 that receives and guides the outer end of the actuating member 74. The member 74 is also hexagonal so as not to rotate and its outer end is stepped at 78 in eccentric position. A vertical groove 79 in the outer face of the bearing member receives ribs and actuating buttons of switches to be described.

A molded end member 791 fits against the end of the body with a centering shoulder extending into the chamber 75. Screws 80 hold the end member in place and pass through the molded bearing to hold the bearing against rotation. The inner face of the end member is recessed at 81 to fittingly receive two switch bodies 82 and 83. The bodies are pressed by the screws and end member against the outer face of the bearing member 76 to simultaneously form an abutment for the spring 72 and prevent the switches from rattling or becoming displaced. The switch bodies 82 and 83 are identical having ribs on their inner sides with operating pins or plungers 84 and 85 that enter into the groove 79. The pin 84 of switch 82 is opposed to the end of the hexagonal actuating element 74 to be engaged and actuated first by expansion in the thermal button 67 while pin 85 of switch 83 is opposed to the step 78 to be engaged and actuated later or by a somewhat greater expansion in the button and further extension of the actuating plunger 74 into the bearing 76. The actuating plunger 74 is moved by a spring 86 compressed between the end of the shouldered neck 73 and the interior of the actuating member. The spring 86 permits over-travel of the button 71 and pin 68 of the thermostatic element without damage to the switches.

The switches 82 and 83 are the same as the switches 50 and 53. That is they are single pole double throw switches having common terminals that connect to a normally closed terminal in unactuated position and connect to a normally open terminal in actuated position. It is convenient to provide a metallic jumper strip 87 between the common terminals so that the single energizing wire 18 will energize both switches. A projecting neck 88 on the end member has slots or sockets 89 receiving the terminals of the switches and the wires or conductors 18, 19, 20 and 20A are desirably fitted with socket connectors that fit into the slots to removably and electrically engage the terminals.

A rubber cap 90 fits over the end of the body 64 and the end member and neck 88 has thin breakable membranes 91 over holes 92 corresponding to the sockets 89 so that the wires may be pushed therethrough with the membrane sealing against the insulation on the wires.

Only one terminal of switch 83 is utilized to provide an on-off circuit to the wire 19 and fan clutch 6. This closes a few degrees higher than actuation of the switch 82. Switch 82 alternately energizes the conductor 20 and 20A to the shutter control as previously explained.

MODIFIED THERMOSTAT SWITCH

The principal elements of the switch 2 as just described are adapted to permit the switch to be converted to a single control as shown in FIG. 14. For example, if the clutch control is to be omitted, a modified end member 791A is used that is recessed as at 81A to receive and locate a single switch body 82 more centrally of the assembly but with its operating button 84 still opposite and cooperative with the end of the hexagonal operating member 74. The single switch will then control the shutter operator as before.

The thermostatic switch 2 in both its forms may be user to control any structure or machine element in response to temperature change. The control may be single or dual and sequential as desired. Likewise, the shutter operating motor and gear reduction may be used to sequentially operate or drive any given element between two alternate positions in response to signals from the two control wires 20 and 20A.

The projecting neck portion 88 of the switch end member 791 and also 791A are provided with axially extending recesses or notches 93 in their outer sides, adjacent to the slots 82 that receive the common terminals of the switches 82 or 83. These notches provide room for selectively connecting a ground wire to one or all of the switches in the event that circuit requirements for the thermo-switch assembly are best met by grounding the switch. FIG. 16 shows a modification in which such a ground wire 94 having a female socket clip 95 is attached to a prong of the switch and extended up over the end of the neck 88A and down through the notch 93 to where it is clamped under the head of the screw 80. The screw and switch body 2 are of course, grounded to the engine block when installed.

The temperature at which the thermal button 67 and its plunger 68 will actuate the switch can be adjusted by adjusting the distance the button is threaded into the thread 66 and clamping the button in adjusted position by the lock or clamp nut 167.

What is claimed as new is:

1. Temperature control mechanism for an internal combustion engine having a radiator, fan and coolant chamber connected to said radiator comprising, a shutter having louver slats pivoted to swing between open and shut relation to said radiator, a drive bar connected to swing said slots simultaneously, a connecting rod pivotally connected to said drive bar and extending to a crankshaft mounted on one side of said radiator and parallel to the pivot axis of said slats, said connecting rod having a spring drive over travel connection to said drive bar in the slat closing position of the bar and rod, a gear train in a case having a ratio of between 800 and 900 to 1 connected to drive said crankshaft, an electric motor connected to turn the high speed end of said gear train, a cam operated switch mounted in the case of said gear train adjacent said crankshaft and retained in said case by an end plate at the opposite end of the case from the motor, a cam on said crank shaft positioned to actuate said switch at 180° rotated positions of said crankshaft when said slats are open and closed, a second cam on said crank shaft adjacent said first cam, a second switch in said case arranged to be opened by said second cam for small angular rotations of the second cam at 180° angularly spaced positions corresponding to the switch actuating positions of said first cam, said first switch having contacts which alternately and simultaneously make a first circuit and break a second circuit, a switch housing having a pair of switches therein and being threadedly engaged through a wall of said coolant chamber, a thermally responsive element on said switch housing positioned in said coolant chamber and having a plunger extended into said switch housing upon increase of temperature to a predetermined minimum, a first spring urging said plunger to retracted position in said thermally responsive element, a switch operating element positioned to successively actuate said pair of switches, a second spring positioned in thrust transmitting relation between said plunger and said switch operating element, one of said pair of switches having alternately and simultaneously make and break contacts therein with a common energized terminal, said first and second circuits of said first cam operated switch being connected to energize said motor and being connected separately to the make and break contacts of said one of said pair of switches and engaged last by said switch actuating element, a magnetic clutch arranged to drive said fan, an energizing circuit for said clutch connected through the second of said pair of switches to be closed by lesser extension of said actuating element, and a holding circuit controlled by said second cam operated switch connected between said first and said second circuits, said crank shaft being of square cross section with rounded edges drivingly receiving said cams and said crank and the final gear of said gear train.

2. Temperature control mechanism for an internal combustion engine having a radiator, fan and coolant chamber connected to said radiator comprising, a shutter having louver slats pivoted to swing between open and shut relation to said radiator, a drive bar connected to swing said slats ismultaneously, a connecting rod pivotally connected to said drive bar and extending to a crankshaft mounted on one side of said radiator and parallel to the pivot axis of said slats, a gear train in a case having a high ratio connected to drive said crankshaft, an electric motor connected to turn the high speed end of said gear train, a cam operated switch mounted in the case of said gear train adjacent said crankshaft, a cam on said crank shaft positoned to actuate said switch at 180° rotated positions of said crankshaft when said slats are open and closed, a second cam on said crank shaft adjacent said first cam, a second switch in said case arranged to be opened by said second cam for small angular rotations of the second cam at 180° angularly spaced positons corresponding to the switch actuating positions of said first cam, said first switch having contacts which alternately and simultaneously make a first circuit and break a second circuit, a switch housing having a pair of switches therein and being threadedly engaged through a wall of said coolant chamber, a thermally responsive element on said switch housing positioned in said coolant chamber and having a plunger extended into said switch housing upon increase of temperature to a predetermined minimum, a first spring urging said plunger to retracted position in said thermally responsive element, a switch operating element positioned to successively actuate said pair of switches, a second spring positioned in thrust transmitting relation between said plunger and said switch operating element, one of said pair of switches having alternately and simultaneously make and break contacts therein with a common energized terminal, said first and second circuits of said first cam operated switch being connected to energize said motor and being connected separately to the make and break contacts of said one of said pair of switches and engaged last by said switch actuating element, a magnetic clutch arranged to drive said fan, an energizing circuit for said clutch connected through the second of said pair of switches to be closed by lesser extension of said actuating element, and a holding circuit controlled by said second cam operated switch connected between said first and said second circuits.

3. Temperature control mechainsm for an internal combustion engine having a radiator and coolant chamber connected to said radiator comprising, a shutter having louver slats pivoted to swing between open and shut relation to said radiator, a drive bar connected to swing said slats simultaneously, a connecting rod pivotally connected to said drive bar and extending to a crankshaft mounted on one side of said radiator and parallel to the pivot axes of said slats, a gear train in a case having a ratio of between 800 and 900 to 1 connected to drive said crankshaft, an electric motor connected to turn the high speed end of said gear train, a cam operated switch mounted in the case of said gear train adjacent said crankshaft, a first cam on said crankshaft positioned to actuate said switch at 180° rotated positions of said crankshaft when said slats are open and closed, said switch having contacts which alternately and simultaneously make a first circuit and break a second circuit, a second cam on said crankshaft, a second cam operated switch in said case positioned to be opened by said second cam for short angular rotations by the cam when said first cam is in switch actuating position, a switch housing having a thermal switch therein and being engaged through a wall of said coolant chamber, a thermally responsive element on said switch housing positioned in said coolant chamber and having a plunger extended into said switch housing upon increase of temperature to a predetermined minimum, a first spring urging said plunger to retracted position in said thermally responsive element, a switch operating element positioned to actuate said thermal switch, a second spring positioned in thrust transmitting relation between said plunger and said thermal switch operating element, said thermal switch having alternatively and simultaneously make and break contacts therein with a common energized terminal, said first and second circuits of said first cam operated switch being connected to energize said motor and being connected separately to the make and break contacts of said thermal switch, and a holding circuit controlled by said second cam operated switch connected between said first and second circuits.

4. Temperature control mechanism for an internal combustion engine having a radiator and coolant chamber connected to said radiator comprising, a shutter assembly having louver slats pivoted to swing between open and shut relation to said radiator, a drive connection connected to swing said slats simultaneously, a connecting rod pivotally connected to said drive connection and extending to a crankshaft mounted on one side of said assembly, a gear train in a case having a high ratio connected to drive said crankshaft, an electric motor connected to turn the high speed end of said gear train, a cam operated switch mounted in the case of said gear train adjacent said crankshaft, a first cam on said crankshaft positioned to actuate said switch at 180° rotated positions of said crankshaft when said slats are open and closed, said switch having contacts which alternately and simultaneously make a first circuit and break a second circuit, a second cam on said crankshaft, a second cam operated switch in said case positioned to be opened by said second cam for short angular rotations by the cam when said first cam is in switch actuating position, a thermal switch thermally responsive to temperature in said coolant chamber, said thermal switch having alternatively and simultaneously make and break contacts therein with a common energized terminal, said first and second circuits of said first cam operated switch being connected to energize said motor and being connected separately to the make and break contacts of said thermal switch, and a holding circuit controlled by said second cam operated switch connected between said first and second circuits.

5. Temperature control mechanism for an internal combustion engine having a radiator, fan and coolant chamber connected to said radiator comprising, a shutter having louver slats pivoted to swing between open and shut relation to said radiator, a drive shaft connected to swing said slats simultaneously alternately in opening and closing direction, a gear train in a case and having a ratio in excess of 800 to 1 connected to drive said drive shaft, an electric motor connected to turn the high speed end of said gear train, a first cam operated switch mounted in the case of said gear train adjacent said drive shaft, a first cam on said drive shaft positioned to actuate said switch at 180° rotated positions of said drive shaft when said slats are open and closed, said switch having contacts which alternately and simultaneously make a first circuit and break a second circuit, a second cam on said drive shaft, a second switch in said case arranged to be opened by said second cam for short angular periods of rotation of said second cam at 180° spaced positions corresponding to the switch actuating positions of said first cam, a switch housing having a pair of switches therein and being threadedly engaged through a wall of said coolant chamber, a thermally responsive element on said switch housing positioned in said coolant chamber and having a plunger extended into said switch housing upon increase of temperature to a predetermined minimum, a first spring urging said plunger to retracted position in said thermally responsive element, a switch operating element positioned to successively actuate said pair of switches, a second spring positioned in thrust transmitting relation between said plunger and said switch operating element, one of said pair of switches having alternately and simultaneously make and break contacts therein with a common energized terminal and being positioned to be actuated last by extension of said plunger, said first and second circuits of said first cam operated switch being connected to energize said motor and being connected separately to the make and break contacts of said one of said pair of switches, a magnetic clutch arranged to drive said fan, an energizing circuit for said clutch connected through the second of said pair of switches to be closed by lesser extension of said actuating element, and a holding circuit controlled by said second cam operated switch connected between said first and second circuits.

6. Temperature control mechanism for an internal combustion engine having a radiator and coolant chamber connected to said radiator comprising, a shutter assembly having louver slats pivoted to swing between open and shut relation to said radiator, a drive connection connected to swing said slats simultaneously, a connecting rod pivotally connected to said drive connection and extending to a crankshaft mounted on said assembly and parallel to the pivot axes of said slats, a gear train in a case and having a ratio in excess of 800 to 1 connected to drive said crankshaft, an electric motor connected to turn the high speed end of said gear train, a cam operated switch mounted in the case of said gear train adjacent said crankshaft, a cam driven with said gear train positioned to actuate said switch at angularly rotated positions of said crankshaft when said slats are in full open and closed positions, said switch having contacts which alternately and simultaneously make a first circuit and break a second circuit, a switch housing having a switch therein and being engaged through a wall of said coolant chamber, a thermally responsive element on said switch housing positioned in said coolant chamber and having a plunger extended into said switch housing upon increase of temperature to a predetermined minimum, a first spring urging said plunger to retracted position in said thermally responsive element, a switch operating element positioned to actuate said switch in said housing, and a second spring positioned in thrust transmitting relation between said plunger and said switch operating element, said switch in said housing having alternatively and simultaneously make and break contacts therein with a common energized terminal, said first and second circuits of said first cam operated switch being connected to energize said motor and being connected separately to the make and break contacts of said switch in said switch housing.

7. A reducing gear and control for an electrically driven control device comprising, a generally rectangular casing having a flat mounting surface and a transverse partition near one end dividing the casing into a gear chamber and a switch chamber, an end member attachable over the end of said gear chamber by screws passed through said casing, said end member merging on the outside to a circular motor base of lesser diameter than the width of said casing and having internal bosses forming a central motor shaft bearing with countershaft supports and a crank shaft bearing arranged in spaced relation therearound, countershaft and crank shaft supporting holes formed in said partition and alined with the corresponding bosses in said end member, a bearing bushing of plastic material in the crankshaft hole in said partition, a pair of countershafts supported in said partition and end member and a crank shaft of square cross section having a portion with rounded edges supported in said bushing and a round turned portion supported in said crankshaft bearing, the square end of said crankshaft projecting through said switch chamber, a uni-directional electric motor secured to said motor base and having a shaft projecting into said gear chamber, interengaging and connected gears and pinions on said motor shaft, countershafts and crankshaft to drive said crankshaft at a speed reduction of between 800 and 900 to 1, the higher speed gears and pinions being of molded plastic and the lower speed gears being of metal, a pair of switches secured to said partition in said switch chamber and having actuating elements disposed in 90° angularly spaced locations and in axially spaced positions relative to said crankshaft, a plastic cam on the squared portion of said crankshaft having axially spaced cam contours, one of said contours being shaped to depress one of said actuating elements for equally divided 180° rotation of said crankshaft and release the element for the remainder of the rotation, the other of said contours having short angular lifts arranged to depress the other of said actuating elements at 180° spaced points as said first element is released, the switch actuated by said first contour having oppositely opened and closed contacts and a common terminal, the switch operated by the other of said contours having a common terminal and a pair of normally closed contacts opened by depressing of its actuating element, an insulating conduit in said gear chamber between said partition and said end member and overlapping the junction of the motor base with the end member, a pair of selectively energizable conductors passed through said end member exteriorly of said motor base and through said conduit and connected to said oppositely opened and closed contacts, a third conductor extending from the common terminal of said first switch through said conduit in said gear chamber and through said motor base to said motor, conductors connecting the terminals of said other switch to said pair of conductors, a cover plate secured over said switch chamber, and a crank secured to the outer end of said crankshaft.

8. A reducing gear and control for an electrically driven control device comprising, a generally rectangular casing having a flat mounting surface and a transverse partition near one end dividing the casing into a gear chamber and a switch chamber, an end member attachable over the end of said gear chamber by screws passed through said casing, said end member merging on the outside to a circular motor base of lesser diameter than the width of said casing and having internal bosses forming a central motor shaft bearing with countershaft supports and a crank shaft bearing arranged in spaced relation therearound, countershaft and crank shaft supporting holes formed in said partition and alined with the corresponding bosses in said end member, a bearing bushing in the crankshaft hole in said partition, a pair of countershafts supported in said partition and end member and a crank shaft of square cross section having a portion with rounded edges supported in said bushing and a round turned portion supported in said crankshaft bearing, the square end of said crankshaft projecting through said switch chamber, a uni-directional electric motor secured to said motor base and having a shaft projecting into said gear chamber, interengaging and connected gears and pinions on said motor shaft, countershafts and crankshaft to drive said crankshaft at a speed reduction in excess of 500 to 1, a pair of switches secured to said partition in said switch chamber and having actuating elements disposed in angularly spaced locations and in axially spaced positions relative to said crankshaft, a plastic cam on the squared portion of said crankshaft having axially spaced cam contours, one of said contours being shaped to depress one of said actuating elements for equally divided rotation of said crankshaft and release the element for the remainder of the rotation, the other of said contours having short angular portions arranged to actuate the other of said actuating elements at spaced points as said first element is released, the switch actuated by said first contour having oppositely opened and closed contacts and a common terminal, the switch operated by the other of said contours having a pair of normally closed contacts opened by actuation of its actuating element, a pair of selectively energizeable conductors passed through said end member exteriorly of said motor base and through said gear chamber and connected to said oppositely opened and closed contacts, a third conductor extending from the common terminal of said first switch through said gear chamber and through said motor base to said motor, conductors connecting the terminals of said other switch to said pair of conductors, a cover plate secured over said switch chamber, and a crank secured to the outer end of said crankshaft.

9. A reducing gear and control for an electrically driven control device comprising, a tubular casing having a flat mounting surface and a transverse partition near one end dividing the casing into a gear chamber and a switch chamber, an end member attachable over the end of said gear chamber, said end member merging on the outside to a motor base of lesser width than the width of said casing and forming a central motor shaft bearing with a countershaft support and a crank shaft bearing arranged in spaced relation therearound, countershaft and crank shaft supporting holes formed in said partition and alined with the corresponding bearing and support in said end member, a bearing bushing in the crankshaft hole in said partition, a countershaft supported in said partition and end member and a crank shaft of square cross section having a portion with rounded edges supported in said bushing and a round turned portion supported in said crankshaft bearing, the square end of said chankshaft projecting through said switch chamber, a uni-directional electric motor secured to said motor base and having a shaft projecting into said gear chamber, interengaging and connected gears and pinions on said motor shaft, countershaft and crankshaft to drive said crankshaft at a speed reduction in excess of 500 to 1, a pair of switches secured to said partition in said switch chamber and having actuating elements disposed in angularly spaced locations and in axially spaced positions relative to said crankshaft, a plastic cam on the squared portion of said crankshaft having axially spaced cam contours, one of said contours being shaped to depress one of said actuating elements for equally divided rotation of said crankshaft and release the element for the remainder of the rotation, the other of said contours having short angular portions arranged to actuate the other of said actuating elements at spaced points as said first element is released, the switch actuated by said first contour having oppositely opened and closed contacts and a common terminal, the switch operated by the other of said contours having a pair of normally closed contacts opened by actuation of its actuating element, a pair of selectively energizable conductors connected to said oppositely opened and closed contacts, a third conductor extending from the common terminal of said first switch through said gear chamber and through said motor base to said motor, conductors connecting the terminals of said other switch to said pair of conductors, a cover plate secured over said switch chamber, and a crank secured to the outer end of said crankshaft.

References Cited by the Examiner

UNITED STATES PATENTS

| | | | |
|---|---|---|---|
| 1,640,233 | 7/1927 | Collins | 236—35.3 |
| 1,837,564 | 12/1931 | McCaleb | 236—35.3 |
| 1,858,622 | 5/1932 | Gysin. | |
| 2,089,288 | 8/1937 | Moorhouse | 236—35.2 |
| 2,184,701 | 12/1939 | Kriechbaum | 236—16 |
| 2,351,203 | 6/1944 | Hanson | 236—35.2 |
| 2,420,775 | 5/1947 | Griffith | 200—140 |
| 2,445,625 | 7/1948 | Meinholdt | 200—140 |
| 2,591,392 | 4/1952 | Weiser. | |
| 2,711,458 | 6/1955 | Eskin | 200—140 |
| 2,723,830 | 11/1955 | Markley | 251—134 |
| 2,964,601 | 12/1960 | Stockwell | 200—47 |
| 2,988,609 | 6/1961 | Evans | 200—47 |

ALDEN D. STEWART, *Primary Examiner.*

ROBERT K. SCHAEFER, *Examiner.*

H. B. O'DONNELL, *Assistant Examiner.*